5992X
T. R. Williams.
No Printed Specification Available
Felting Machine.
No.
Patented. May 22. 1830.
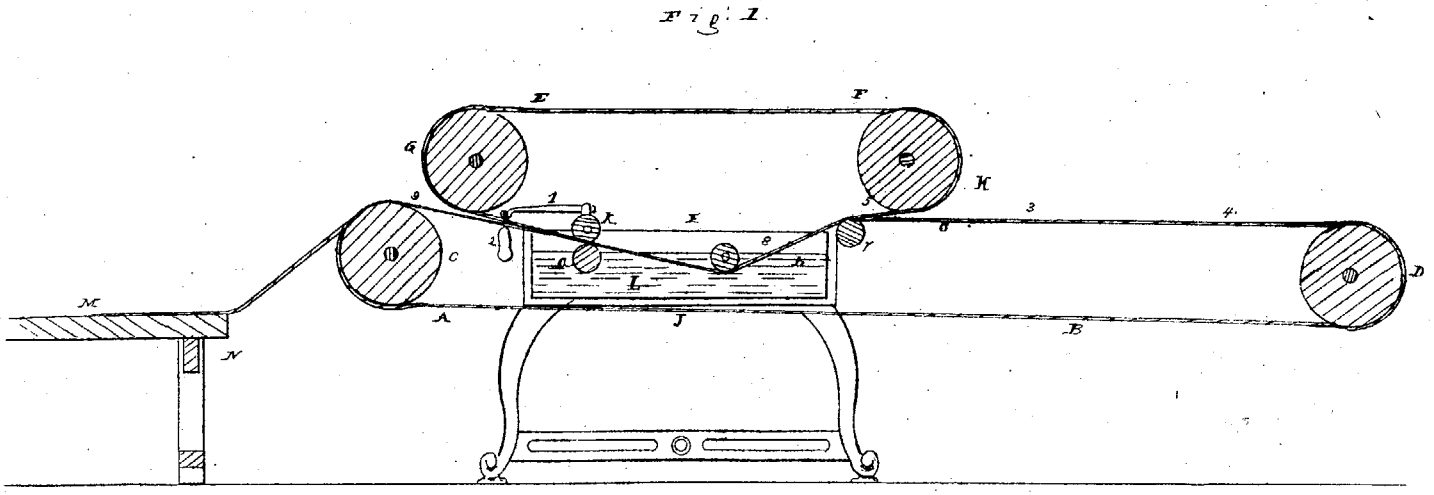

Thomas R. Williams
Letters Patent

The Schedule referred to in these Letters Patent and making part of the same containing a description in the words of the said Thomas R. Williams himself of his improvement in the method of making or manufacturing Felt or a substance in the nature thereof applicable to covering the bottoms of vessels & other useful purposes."

My improvement in the "making or manufacturing of felt or a substance in the nature thereof applicable to covering the bottoms of Vessels and other useful purposes." I declare to be in manner and form following, reference being had to the accompanying drawings. that is to say. Fig 1 Represents a section of the machine and A B. an endless web of woven wire extended upon and passing around the two rollers or drums. C.D. Upon this endless web is received the different substances of which I make the felt, or a substance in the nature thereof. these substances are first prepared such as hair wool, cotton, hemp, flax &c. by a carding Engine, blowing machine, picker or any other machine attached to this, and capable of spreading the material or materials evenly upon the web of woven wire. E.F. Another endless web of woven wire extended upon and passing around the two drums G.H. I.J. A cistern or box which contains the mixture in which the materials are to be immersed. this cistern or box is heated when required either by a steam pipe passing through and coiled within it, or by a fire applied underneath it. as may be found most convenient. K.L. are two metallic rollers mounted in bearings at each end. the upper one being pressed upon the lower by levers and weights as at 1 & 2. these rollers receive any required motion by being connected with any convenient part of the preparatory machine. It will now be readily seen that as both the endless webs of woven wire pass

5/22/1830 5992X between the weighted rollers K. L. whilst in motion that they will
be drawn forwards and consequently receive a rotary motion which
will likewise be communicated to the four rollers or drums C
D .G. H. and that when the different substances are prop-
erly spread upon the endless web as seen at 3 and 4. they will
move onwards until they are received between the two sheets of woven
wire as at 5 and 6 and thence onwards over the roller 7 and down
into the liquid (the surface of which is shown by the dotted line a. b)
such as melted tar and pitch or other mixtures. then under the roll-
er 8. after which they pass up again out of the liquid between the
metallic rollers K. L. where all that may be superfluous .. is .. pres-
sed out and falls again into the cistern. while the felt, or substance
in the nature thereof, will still move onwards until it is liberated from
between the two sheets of woven wire, as seen at 9. where from the
action of the rollers and liquid, it is sufficiently compressed and only
remains to be deposited upon the table M.N. where it is either cut
into sheets or rolled up in lengths as may be required.

For the purpose of covering Ships bottoms or houses a felt com-
posed of hair immersed in a composition of tar and pitch. or
rosin is preferable. but by varying the material and using hemp flax
cotton or wool. and by varying the composition or mixture through
which the same is passed, and adding size or glue and clay whiting
lime or other substances. I produce a felt or a substance in the nature
thereof, of greater firmness. adapted to the same uses, as mill board
paste boards floor cloth and for other purposes. I may also further
add that I sometimes make use of two separate sheets or pieces.
(instead of a continuous web) between which the hair &c are pla-
ced. and whilst so between them. they are immersed in the required
liquid and subjected to the pressure of rollers, as in the above described
manner. In reference to the above description, I hereby declare,
that I do not claim as my Invention, any novelty in the manner
of spreading the materials upon the web as before described. as I make use of either the common carding Engine, blowing machine, pick
er, or any other method of doing it as evenly as possible. But I do
claim as my Invention the making use of two sheets or webs for
this purpose, whether they be as before mentioned, of woven (or plait
ed laid or braided) wire or even perforated sheets of metallic or other
substances, and the method of subjecting the different materials, —
whilst between them, to the action of the rollers in such liquids as
I wish to impregnate the different materials with.

In witness whereof I have hereunto set my hand and seal
this 27th day of August, One thousand Eight hundred and twenty nine Witness
Thos. R. Williams
Thos Aspinwall. Consul of the U.S.A. London Eng.
[illegible] Selouef Jr. Vice Consul U.S.A.

Patented May 22. 1830

Exd. W.G.C.

(888 words)